March 13, 1928. 1,662,246
J. M. GOLDBERG
AUTOMOTIVE VEHICLE CONSTRUCTION
Filed Sept. 15, 1927 2 Sheets-Sheet 1
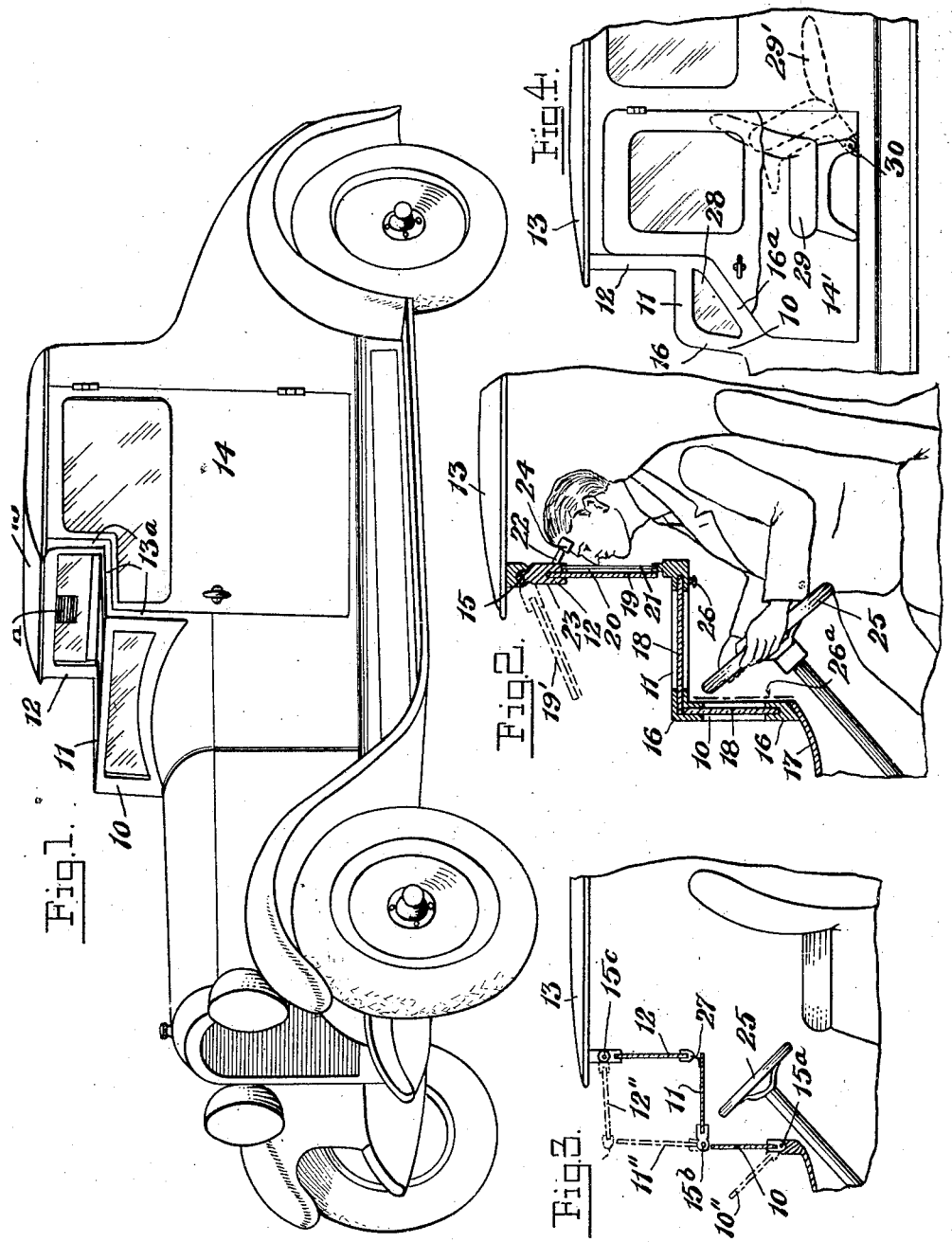
Inventor
Jacob M. Goldberg
By his Attorneys
Edwards + Henry March 13, 1928.　　　　J. M. GOLDBERG　　　　1,662,246
AUTOMOTIVE VEHICLE CONSTRUCTION
Filed Sept. 15, 1927　　　2 Sheets-Sheet 2
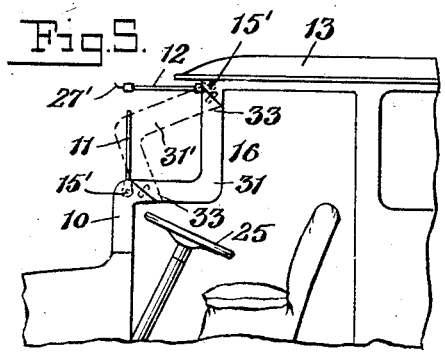
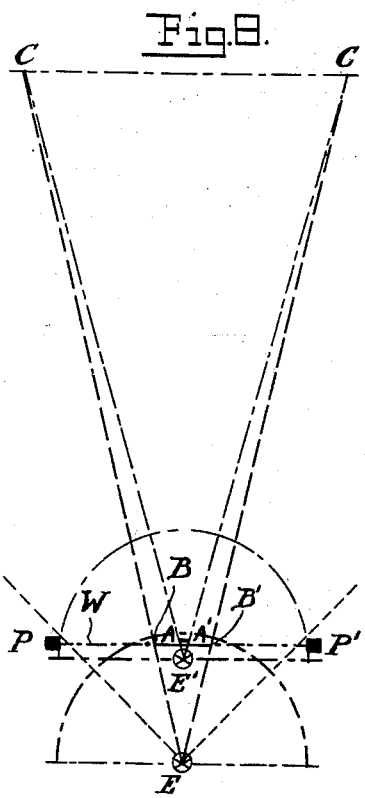
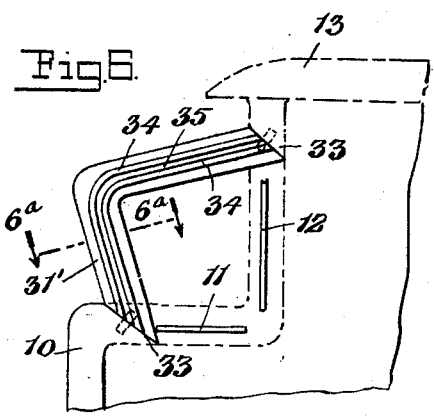
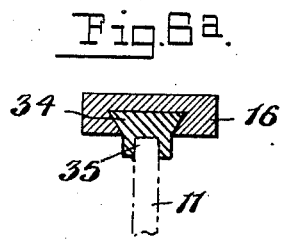
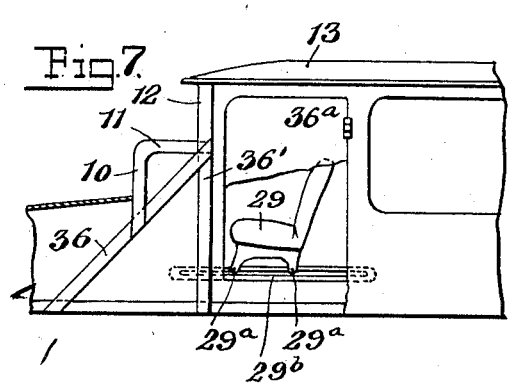
Inventor
Jacob M. Goldberg
By his Attorneys Patented Mar. 13, 1928.

1,662,246

UNITED STATES PATENT OFFICE.

JACOB M. GOLDBERG, OF BROOKLYN, NEW YORK.

AUTOMOTIVE VEHICLE CONSTRUCTION.

Application filed September 15, 1927. Serial No. 219,602.

The subject of this invention is a new structure for the forward or driver's portion of a sedan, limousine, coupé, or other similar type of automobile body permanently and rigidly roofed over, and having side walls, at said portion, that is, for the driver's compartment.

An essential of the invention is the provision of a front wall for said forward structure, including a forward, lower upstanding section, a rear upper upstanding section, and an intermediate more or less horizontal section, as the main and only and not as a lesser or auxiliary wind-shield, for a closed automobile.

The prime object of such construction is to maintain the closed characteristics of a sedan or the like and yet avoid side posts at the level of the driver's eyes and in positions to interfere with his off-side vision; thus to permit also the attainment of one or more of the following objects, among others:—

The elimination or diminution of rear reflections by a minimizing of the area thru which the driver has to focus his vision; a similar reduction to a minimum of side reflections for the same reason; reduction in area of a shield against glare of headlights from oncoming automobiles; the attainment of a clearer vision at all times and under all conditions thru the increased proximity of the shield to the driver's eyes; the advantage of having to keep only a minimum area clear from rain or snow during inclement weather and therefore rendering this area effectively and easily wiped; the advantage of increased protection for the driver's hands against wind, rain and snow when it is desired to maintain the upper panel in an open condition together with the possibility of utilizing the novel structure for attaching a lap robe to the edge of the shield so as to give further protection to the arms and body of the operator without sacrificing visibility of the instrument board as is necessary under present day structures; and finally the provision of such a multiplanar wind-shield construction that while the arms and body of the operator are completely protected from the weather he, although entirely free to manipulate his controls, has the wind-shield brought so close to his eyes that his range of vision is greatly increased, thereby attaining objects hereinbefore set forth.

Various other objects and advantages of the invention than those hereinabove mentioned will be specifically pointed out or will be apparent hereinafter in the course of the below detailed description of the forms of this invention shown, in the accompanying drawings, as preferred ones of the various possible embodiments of the invention; it being understood, naturally, that such forms are merely illustrative of some of the many possible combinations and arrangements of parts well calculated to attain the objects of the invention, and hence said detailed description of such forms is not to be taken as at all defining or limiting the invention itself. That is to say, the scope of protection contemplated is of course to be taken from the appended claims, interpreted as broadly as is consistant with the prior art.

In the accompanying drawings:

Fig. 1 is a perspective view of a form of the invention constituting a roadster incorporating the new structure;

Fig. 2 is an enlarged longitudinal sectional view showing the increased proximity between wind-shield and operator's eye;

Fig. 3 is a view similar to Fig. 2, showing certain modifications;

Fig. 4 is an elevational view showing other modifications, or a variant embodiment;

Fig. 5 shows another embodiment incorporating hinged rigid side L-frames;

Fig. 6 illustrates, on an enlarged scale, a preferred detail of the form of Fig. 5;

Fig. 6$^a$ is a detail section taken on line 6$^a$—6$^a$ of Fig. 6;

Fig. 7 shows another modification; and

Fig. 8 is a diagram indicating graphically the increased visual angle, decreased view-area, and other advantages of the invention.

Similar reference characters refer to similar parts throughout the several views.

In Fig. 1, there is shown incorporated in a present day type of roadster the new wind-shield structure 10—11—12. In this structure, there are a lower forward upstanding element 10, a rear upper upstanding element 12, and an intermediate more or less horizontal element 11.

Similar arrangements are shown in Fig. 2 to 7, all forming, with the coach roof 13, parts of the new forward body structure; the different forms illustrated in these views being shown as some exemplifying, of the many possible, structures according to the invention,—and to illustrate also different possible side-door installations, different ingress-facilitating features, etc., etc., which might be incorporated pursuant to the invention.

In Fig. 1, the structure 10—11—12 is entirely rigid as to its triplanar side-posts 13ᵃ; and a side-door 14 is made to conform at its forward side to the side-posts 13ᵃ. The structure 10—11—12, being permanently in-built as just indicated, permits no selective variation in the angles of intersection of the various planes of the elements 10, 11 and 12.

This, however, may be provided for in a suitable way, as by hinging the component parts to one another as will now be explained in connection with Figs. 2 and 3.

In Fig. 2, elements 10, and 11 are permanent structures including metal frames 16 forming rigid parts of the body 17, and carrying glass inserts 18; while element 12 is joined, as by hinging at 15, to the cross-beam indicated forming part of the roof 13; so that the element 12 may be swung out as indicated.

In Fig. 3, these elements 10, 11 and 12 are all hinge-pivoted, for adjustment purposes, as indicated at 15ᵃ, 15ᵇ and 15ᶜ; so that, for instance, the elements 10, 11 and 12 may be thrown to the locations indicated at 10″, 11″ and 12″.

In the various views, 25 indicates the steering-wheel.

In Fig. 2 the following features are shown, all or any of which may also be incorporated in any of the illustrated or other forms of the invention:

The element 12 is shown as including a forward glass pane 19 separated by an air-sheet 20 from a transparent non-breakable protector such as celluloid 21; the advantage of this apparent complexity of structure being, that should a collision occur, shattering glass 19, the driver's face would be absolutely protected against flying glass fragments, and, further, the close proximity between the operator's face and the wind-shield superstructure element 12 is at the yieldable member 21 immediately in back of the air-sheet 20.

This element 12 also includes, in Fig. 2, a frame 23, which is the member carrying part of the above-mentioned hinge 15. And frame 23 has mounted thereon an additional safety device against injury to the operator's face on sudden stoppage of the car; this device being a suitably resilient or cushioned forehead pad 24, say spring-urged downwardly of a post 22 on frame 23.

Directly in front of the driver's chest will be found an element 26, which may be the male member of a snap-fastener to coact with the female member thereof on a lap robe, (not shown); which robe, having two suitable fore-arm holes for the driver; may then pass straight down and under the steering-wheel 25, and so clear his line of vision to the instrument board (say at 26ᵃ) at all times.

In Fig. 2, it will be noted, the only structural element that is freely movable, is the pane 19, which is capable of opening outward as indicated at 19′. Here the celluloid member 21 (which may be "buckled" and removed from its seating grooves when the glass pane 19 is swung to 19′ to get front ventilation) acts as a water-inseep protector when the glass pane is closed and down.

Referring in this connection to Fig. 3, similar protection against water-inseep is provided by equipping swingable element 12 at its free end with a flap 27 of rubber or similar material; and such a flap or the like may if desired be provided at the free end of swingable element 10.

As shown in Fig. 1, at A, all the forms of the invention may be provided with an amber or other suitable anti-glare sheet or area of exceedingly small size, say of an inch or two to one-side of normal straight-ahead gaze; so that a slight side move of the head temporarily brings the element A between the driver's eyes and an oncoming car with blinding lights.

Fig. 4 shows a permanent construction wherein all the elements 10, 11 and 12 are rigidly positioned in a predetermined fixed relation, but with the side frame 16 strutted at 16ᵃ to carry a glass side-pane 28. Here the door opening is somewhat different from that of Fig. 1; coacting with a door 14′.

In order to make easier the ingress to or egress from the driver's seat of a corpulent person, such seat may be hinged as in Fig. 4 or slidably mounted as in Fig. 7.—the latter view chiefly illustrating the possible addition of an inclined floor-reactant bracing-strut 36, and a similar vertical strut 36′, making a stronger body; while providing a standard rectangular door-opening 36ᵃ.

These movable seats of Figs. 4 and 7 are shown at 29. The seat 29 of Fig. 4 is pivoted at 30, so that it may be swung back to the position indicated at 29′ to facilitate ingress and egress of the driver. The seat 29 of Fig. 7 has pins or rollers 29ᵃ at the sides of its leg-bottoms, riding in slots in tracks 29ᵇ—the seat 29 here being shown somewhere between its extreme forward and backward positions.

In the form of Figs. 5 and 6, wherein the elements 11 and 12 only are adjustable about pivots 15′ (as in Fig. 2), a side-frame structure is at each side of the body which includes a rigid L-frame 31, swingable about the pivots 33, from the full line position of Fig. 5, outwardly through 180° to assume the position shown in broken lines in Fig. 5 at 31' and in full lines in Fig. 6,—to facilitate ingress to the driver's seat with such seat fixed in place.

The free or swinging end of the element 12 of Fig. 5 also desirably carries a sealing element 27' similar in function to the element 27 of Fig. 3. As shown in Figs. 6 and 6ª, L-frames 31 carry by a dove-tail mount a rubber strip 34 having a channel 35 to form a snap fit on the glass panes carried by elements 11 and 12 when said elements are arranged as indicated in Fig. 6 (preferably preparatory to swinging the L-frames 31 from the full-line positions of Fig. 6 to the full-line positions of Fig. 5).

Having set forth a practicable embodiment and some possible structural variations, it will be seen from the diagram of Fig. 8 that the increased proximity between the eye and the windshield in every case makes for the objects hereinbefore set forth. E indicates the eye-location relative to the windshield W in the ordinary closed automobile, while E' indicates the proximity of such eye to such windshield according to the present invention. Let P and P' indicate the usual side posts. Advancing the eye from E to E' increases the visual angle from PEP' to PE'P' (almost from 90° to 180°). As CC represents the width of road desired to be seen at about twenty feet ahead in bad weather, then it is also clear that moving the eye from E to E' decreases the area to be kept wiped from BB' to AA'. This also makes possible the use of a very small glare-shield-spot located at some convenient spot on the window pane, and as hereinabove explained. Similarly, all the other objects of the invention stated or indicated, are attained.

Inasmuch as many changes could be made in the above constructions, and many apparently widely different embodiments of the invention could be made without departing from the scope thereof, it is intended that all matter contained in the above description or shown in the accompanying drawings shall be interpreted as illustrative and not in a limiting sense.

It is also to be understood that the language contained in the following claims is intended to cover all the generic and specific features of the invention herein described, and all statements of the scope of the invention which, as a matter of language, might be said to fall therebetween.

I claim:

1. In a closed-type automobile body having a roof, a forward structure of stepped form transverse to the body below said roof, said structure having a steering-wheel-hooding lower portion and a windshield superstructure joined at its top to said roof, in combination with a driver's seat in the body adapted to bring the eye of a driver on said seat into close proximity with a transparent element of said superstructure whereby the visual angle is hardly decreased from 180° (by side post obstruction) while the vision area of said element is greatly decreased over that required in present day structures, said forward structure including L-shaped side frames.

2. In a closed-type automobile body having a roof, a forward structure of stepped form transverse to the body below said roof, said structure having a steering-wheel-hooding lower portion and also having a windshield superstructure joined at its top to said roof, said superstructure including a transparent element, in combination with a driver's seat in the body adapted to bring the eye of a driver on said seat into close proximity with said transparent element whereby the visual angle is approximately 180 degrees while the vision area of said element is greatly decreased over that required in present day structures, said forward structure including L-shaped side frames.

3. In a closed type automobile body having a roof, a forward structure of stepped form transverse to the body below said roof, said structure having a steering-wheel-hooding lower portion and also having a windshield superstructure joined at its top to said roof, said superstructure including a transparent element, in combination with a driver's seat in the body adapted to bring the eye of a driver on said seat into close proximity with said transparent element whereby the visual angle is approximately 180 degrees while the vision area of said element is greatly decreased over that required in present day structures, said forward structure including L-shaped side frames, said side-frames being pivoted along lines oblique to the horizontal.

JACOB M. GOLDBERG.